Jan. 5, 1926.  1,568,759
J. G. MAGIN ET AL
DISTANCE FINDER
Filed May 27, 1922   2 Sheets-Sheet 1
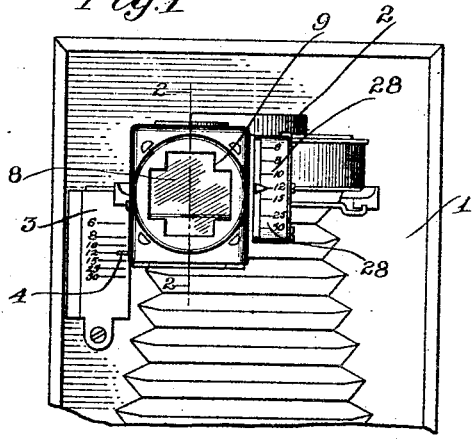
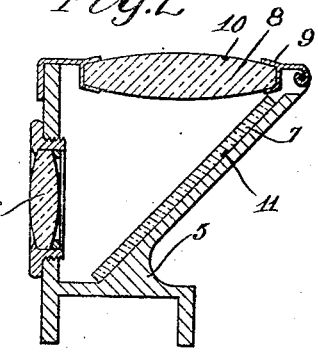
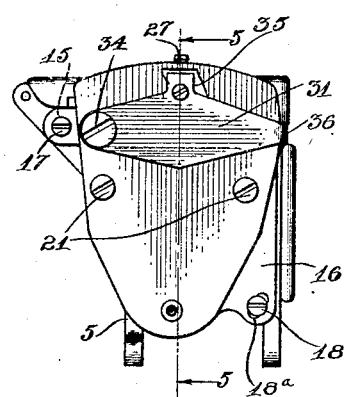
INVENTOR
Jacob G. Magin
Andrew Wollensak
BY
their ATTORNEYS Jan. 5, 1926.
J. G. MAGIN ET AL
1,568,759
DISTANCE FINDER
Filed May 27, 1922
2 Sheets-Sheet 2
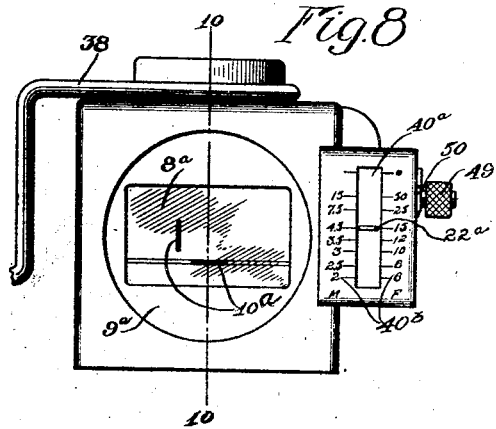
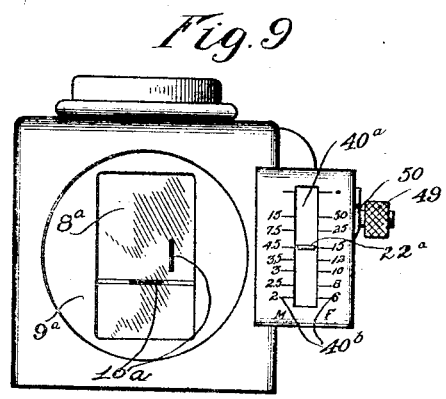
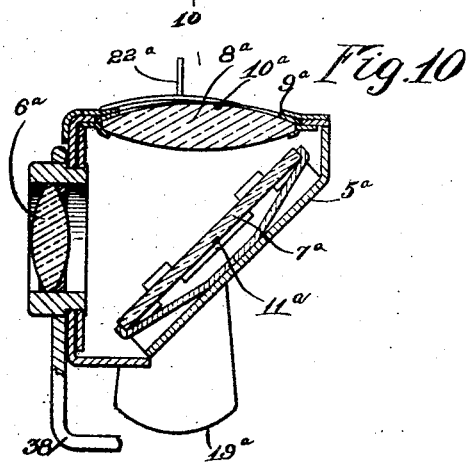
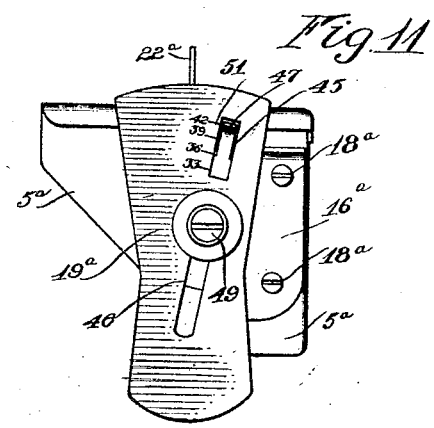
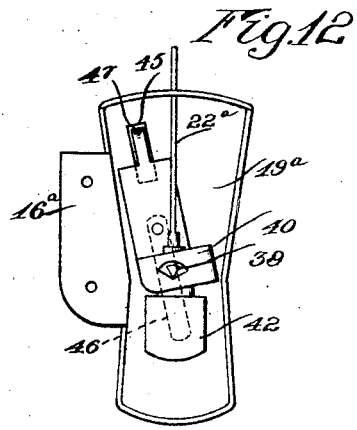
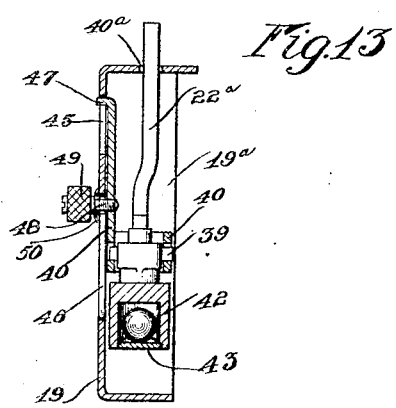
INVENTOR
Jacob G. Magin.
Andrew Wollensak.
BY
Davis & Simms
their ATTORNEYS.

Patented Jan. 5, 1926.

1,568,759

UNITED STATES PATENT OFFICE.

JACOB G. MAGIN AND ANDREW WOLLENSAK, OF ROCHESTER, NEW YORK, ASSIGNORS TO WOLLENSAK OPTICAL COMPANY, OF ROCHESTER, NEW YORK, A CORPORATION OF NEW YORK.

DISTANCE FINDER.

Application filed May 27, 1922. Serial No. 564,266.

*To all whom it may concern:*

Be it known that we, JACOB G. MAGIN and ANDREW WOLLENSAK, citizens of the United States, and residents of Rochester, in the county of Monroe and State of New York, have invented certain new and useful Improvements in Distance Finders, of which the following is a specification.

The present invention relates to view finders and more particularly to the type designed for use with photographic cameras, an object of this invention being to provide a view finder with simple and inexpensive means for determining the distance the object to be photographed is situated from the finder. Another object of the invention is to provide a view finder with a sighting means for assisting the user of the finder to cause the axis of the finder substantially to intersect a point on a horizontal surface on which the user of the finder is standing directly beneath the object to be viewed, combined with means for determining the distance of the finder from such subject controlled by the position of the finder, determined by the sighting means, with reference to such horizontal surface.

To these and other ends, the invention consists of certain parts and combinations of parts, all of which will be hereinafter described: the novel features being pointed out in the appended claims.

In the drawings:

Fig. 1 is a fragmentary view of a camera equipped with the present invention;

Fig. 2 is a section on the line 2—2, Fig. 1;

Fig. 3 is a side view of the view finder embodying the present invention;

Fig. 4 is a detail view of the interior of the indicating means;

Fig. 5 is a section on the line 5—5, Fig. 3;

Fig. 6 is an edge view of the distance indicating means;

Fig. 7 shows diagrammatically the manner in which the finder is shifted, in order to bring the indicating means into effect;

Fig. 8 is a plan view of another embodiment of the invention showing the finder adjusted to one position;

Fig. 9 is a plan view of another embodiment of the invention showing the finder adjusted to another position;

Fig. 10 is a section on the line 10—10, Fig. 8;

Fig. 11 is a side view of the embodiment of the invention shown in Figs. 8 to 10, inclusive;

Fig. 12 is an interior view of the indicating means of such last mentioned embodiment; and Fig. 13 is a section on the line 13—13, Fig. 12.

In both illustrated embodiments of the invention, a view finder, in this instance, what is known to the trade as "a brilliant view finder" is provided with sighting means for assisting the user of the finder to cause the axis of the finder to substantially intersect a horizontal surface on which the user of the finder is standing directly beneath the object to be viewed and photographed, so that it is possible to form a triangle, the base of which extends from the finder to the horizontal surface, the perpendicular of which extends from the point on the horizontal surface below the finder to a point on the horizontal surface directly beneath the object to be viewed, and the hypothenuse of which extends from the finder to the point on the horizontal surface directly beneath the object to be viewed, as will be seen by referring to Fig. 7 of the drawings. The distance of the finder above the surface on which the user stands is known, provision being made for adjusting the finder to correspond to a position in a horizontal line with the hips of the user. The adjustment of the finder, so that the axis will intersect a point on the horizontal surface on which the user is standing, directly beneath the object to be viewed, will give the angle between the base and the hypothenuse of the triangle and the finder is provided with indicating means which will give in feet on a scale, like the focusing scale on the camera, the length of the perpendicular of the triangle or, in other words, the distance between the camera and the object.

In the embodiment of the invention illustrated in Figs. 1 to 6, 1 indicates the support on which the lens and shutter 2 of the camera is adjustable in any known manner. The support 1 has a scale 3 with which a pointer 4, moving with the lens and shutter, cooperates for positioning the lens on the support 1 at a point corresponding to the distance of the object from the camera.

Mounted to move with the lens is the finder, in this instance, of the type known as a brilliant view finder comprising a casing 5 having an objective lens 6 in the front wall thereof which throws an image upon a reflector or mirror 7 from which it is viewed by a screen 8, in this instance, in the form of a lens. The casing 5, as is common, is mounted so that the finder may be used when the camera is turned to take a vertically elongated picture or a horizontally elongated picture, a frame 9 being associated with the screen 8 so as to define the portion of the object which will be covered by the lens.

Associated with the view finder is a sighting means which, in this instance, embodies two pairs of marks or sighting devices 10 and 11 arranged in spaced relation in the finder, one, in this instance, being positioned on the lens or screen 8 and the other being positioned on the mirror or reflector 7. The two pairs of sighting marks are provided so that one pair may be employed for each adjustment of the finder. In using the sighting means, the user of the camera holds the latter in a horizontal position pointed at the object to be covered. The head of the user is then bent forwardly over the camera, so as to bring the two sighting marks 10 and 11 into alignment. The body is then bent at the hips, carrying the camera downwardly or upwardly without changing the position of the head with reference to the two marks 10 and 11, these being held in alignment during the tilting of the camera and bending of the body. When the mark 11 coincides with the point on the horizontal surface on which the user of the camera is standing, directly beneath the object to be viewed then the proper angle of the camera is obtained and the triangle hereinbefore mentioned is defined.

With the end in view of determining the distance of the object from the position of the finder with reference to the horizontal surface determined by the sighting means, there is employed an indicating means which, in this instance, embodies a casing having a portion or plate 14 with two ears 15 and 16 secured by screws 17 and 18, respectively, to the side of the casing 5 of the finder. A casing member 19 with a wall or flange 20 is secured with its wall or flange in abutment with the wall 14 by screws 21. Within the casing a pointer or indicator 22 is mounted being preferably bent laterally at 23 and then upwardly at 24 to provide bearings for the pivot 25 of the pointer. The upper end of this pointer operates through a slot 26 formed in the flange 20 of the casing member 19 and is turned laterally at 27 to operate over the top wall of the casing member 19. On this top wall a scale 28 is provided with graduations corresponding to the graduations or camera focusing scale 3. The opening 18ª through which the fastener 18 extends is in the form of a slot which permits the distance finder to be adjusted on the casing of the view finder in order that the distance finder may be correctly positioned on such view finder.

To the end that the pointer 22 may be subject to the influence of the tilting movement of the finder and the camera, means is provided such as a weight 29 which is pivoted on bearings 30 above the pivot of the pointer 22, these bearings being mounted upon a carrier 31 which is adjustable on the casing for the indicating mechanism for the purpose to be described. Connection between the weight 29 and the pointer 22 is established, in this instance, by a pin 32 on the weight operating in a hollow slot 33 in the indicator. The carrier 31 for the weight is, in this instance, in the form of a lever pivoted at 34 on the outer wall of the casing for the indicating mechanism, the bearing for the weight being arranged eccentrically with reference to this pivot, so that, when the lever 31 is moved up and down, the pivot will have a substantially vertical movement, the casing being slotted at 35 to permit the carrier to extend into the casing and connect with the weight.

In order to determine the adjustment of the carrier on the casing, an indicating means is provided comprising a pointer 36 formed by bending the end of the carrier laterally over one side wall of the casing, this pointer cooperating with the scale 37 which will represent in feet or other linear measurement the height at which the finder will be held by different users. The user of the finder first ascertains a position which will be in a horizontal line with the hips. He then measures the distance of the front and lens support 1 of the camera from the surface on which he is standing. This distance having been obtained, the pointer 36 is adjusted over the scale 37 to correspond to the number corresponding nearest to the linear measurement of such distance, thus adjusting the finder for the base of the triangle.

In the embodiment of the invention, illustrated in Figs. 8 to 13, inclusive, the finder is of a known type being supported on the camera by a supporting arm 38 on which the finder casing 5ª is rotatable. This finder casing has an objective lens 6ª held against turning on the arm 38, a mirror or reflector 7ª and a screen or viewing lens 8ª. This lens is rotatable in the casing 5ª with a field defining mask 9ª through a means which operates, when the casing 5ª is turned relatively to the lens 6ª. This causes the elongated opening in the field defining mask 9ª to assume two positions at right angles to each other at the opposite ends of the turning movement of the casing 5ª. This being a known form of camera finder, will not be described with any further detail herein.

On the mirror or reflector 7ª the front sighting mark or device 11 is formed and on the viewing lens 8ª, two rear sighting devices or marks 10ª are provided at right angles to each other, one of these marks being employed when the finder is adjusted for a horizontal elongated picture and the other of said marks being employed when the finder is adjusted for a vertically elongated picture. Either of the two rear sighting devices 10ª, when in properly adjusted position, may be employed for the sighting device 11ª for the purposes of assisting the user of the finder to cause the axis of the finder substantially to intersect at a point on a horizontal surface to which the person is standing, directly beneath the object to be viewed.

The distance determining and indicating means in this embodiment of the invention employs a casing member 16ª secured by screws 18ª to the casing 5ª. A casing member 19ª is secured by screws 21 to the casing member 16. In the casing 19ª, thus formed, an indicator 22ª is mounted. This indicator, in this instance, has knife bearings 39 projecting from opposite sides thereof and working in a frame 40, which is adjustable on the casing. The upper end of the indicator extends through a slot 40ª in the casing and on opposite sides of this slot 40ª graduations 40ᵇ are provided, one having indications for feet corresponding to the indications on the focusing scale of the majority of cameras, while the other has indications in meters corresponding to the forcusing scales of other types of cameras, such as those made in foreign countries.

So that the pointer will be subject to the influence of the tilting movement of the finder, a pendent weight is rigidly connected to the pointer below the knife bearings 39. In this instance, this weight is a hollow body 42 with a concave bottom wall 43 and a movable body is arranged in said hollow body. This movable body is in the form of a ball or sphere and rolls on the concave bottom wall 43 to prevent undue vibrations in the pointer 22ª.

In order to make the effective portion of the pointer 22ª correspond to the height of the camera above the surface on which the user is standing, the frame 40 is adjustable to carry the pivot 39 of the pointer vertically with reference to the scale. It is apparent that with the upward adjustment of the frame 40, the effective portion of the pointer 22ª will become nearer to the pivot, as the pointer is adjusted relatively to the scale 40ᵇ. In this instance, the frame 40 is adjustable on the casing member 19ª by providing the casing member with two aligned slots 45 and 46, the frame having a lug 47 projecting into the slot 45, and a screw 48 being extended through the slot 46 and engaging the frame 40, the head of the screw 49 acting as a thumb piece and the friction spring 50 being interposed between the head and the side of the casing, so as to frictionally hold the frame 40 in its adjusted position. The lug 47 may act as a pointer for the scale 51 at one side of the slot 45, this scale being graduated to correspond to the number of feet to which the camera finder will be normally held above the surface on which the user of the camera is standing.

The operation of the invention will be understood from the foregoing description but it may be summarized as follows: The view finder with the distance finder is placed upon a camera which is provided with a focusing scale with the usual graduations. The user ascertains the distance above the ground he will hold the camera and then adjusts the height indicating means to correspond to this distance. After this adjustment the camera is held in a horizontal position in front of the user with the body upright, the head being bent forwardly over the finder until a front and a rear sighting device in the finder are aligned, and the view finder covers the object to be photographed. After this the user bends at the hips without destroying the position of the camera with reference to the body and, while maintaining the front and the rear sighting device in alignment, this being continued until the front sighting device coincides with the point on the surface on which the user is standing directly beneath the object to be photographed. This causes the axis of the finder to lie at an angle with reference to a perpendicular line dropped from the camera to the line on which the user is standing and from this angle, together with the length of the perpendicular line, is determined the distance of the object from the camera, this distance being read off on the distance scale of the finder, which preferably has graduations corresponding to the graduations of the focusing scale of the camera. After the distance is found the user adjusts the camera through the medium of the focusing scale, and takes a picture of the object in the usual manner without changing his position.

From the foregoing it will be seen that there has been provided a combined view and distance finder of simple and inexpensive construction. This finder places in the hands of the user of a camera, a means by which the distance of an object to be photographed may be more quickly measured, so that fewer failures due to improper focusing will occur. It does not require any complicated calculations on the part of the user and the use thereof can be grasped by those below the average in intelligence.

What we claim as our invention and desire to secure by Letters Patent is:

1. In combination with a view finder, sighting means through which may be located in the finder, a point in the horizontal surface on which the user of the finder is standing directly beneath the object to be viewed, and means for indicating the distance of the finder from such object controlled by the position of such finder determined by such sighting means, said means comprising an indicator, a pivotally mounted weight connected to the indicator, and means for adjusting the axis of turning of the weight to vary the reading of the indicator to correspond with the height the view finder is situated above the horizontal surface.

2. In combination with a view finder, sighting means through which may be located in the finder a point on a horizontal surface on which the user of the finder is standing, directly beneath the object to be viewed, a pivoted distance indicator, and a weight pivotally mounted about an axis different from the axis of turning of the indicator, connected to the pointer, and having its axis of turning adjustable relatively to the axis of turning of the indicator.

3. In combination with a view finder, sighting means through which may be located in the finder a point on a horizontal surface at a point on which the user of the finder is standing, directly beneath the object to be viewed, a pivotally mounted distance indicator, and a weight mounted to turn about an axis different from the axis of turning of the indicator and having a pin and slot connection with the pointer, the axis of the weight being adjustable relatively to the axis of turning of the indicator.

4. In combination with a view finder, sighting means through which may be located in the finder a point on a surface on which the user of the finder is standing, directly beneath the object to be viewed, a pivotally mounted indicator, a weight pivotally mounted on an axis different from the axis of turning of the indicator and having its axis adjustable, adjustable connections between the weight and the indicator, and a scale for indicating the position of the axis of the weight.

5. In combination with a view finder, sighting means through which may be located in the finder a point on a horizontal surface on which the user of the finder is standing, directly beneath the object to be viewed, a pivotally mounted indicator, a pivotally mounted weight, and a carrier on which the weight is mounted adjustable to shift the axis of the weight relatively to the axis of turning of the indicator, and means for indicating the position of the weight with reference to the indicator.

JACOB G. MAGIN.
ANDREW WOLLENSAK.